US010195521B2

(12) United States Patent
Shiota et al.

(10) Patent No.: US 10,195,521 B2
(45) Date of Patent: Feb. 5, 2019

(54) INFORMATION PROCESSING APPARATUS AND PROCESSING METHOD

(71) Applicants: Akatsuki Inc., Tokyo (JP); BANDAI NAMCO Entertainment Inc., Tokyo (JP)

(72) Inventors: Genki Shiota, Tokyo (JP); Koji Tezuka, Tokyo (JP); Kunio Hashimoto, Tokyo (JP); Ken Kanai, Tokyo (JP); Shohei Sekii, Tokyo (JP)

(73) Assignees: Akatsuki Inc., Tokyo (JP); BANDAI NAMCO Entertainment Inc., Tokyo (JP)

( * ) Notice: Subject to any disclaimer, the term of this patent is extended or adjusted under 35 U.S.C. 154(b) by 0 days.

(21) Appl. No.: 15/007,592

(22) Filed: Jan. 27, 2016

(65) Prior Publication Data
US 2016/0214014 A1 Jul. 28, 2016

(30) Foreign Application Priority Data
Jan. 27, 2015 (JP) .................. 2015-013541

(51) Int. Cl.
*A63F 13/2145* (2014.01)
*A63F 13/30* (2014.01)
*A63F 13/80* (2014.01)

(52) U.S. Cl.
CPC .......... *A63F 13/2145* (2014.09); *A63F 13/30* (2014.09); *A63F 13/80* (2014.09)

(58) Field of Classification Search
CPC ....... A63F 13/2145; A63F 13/30; A63F 13/80
See application file for complete search history.

(56) References Cited

U.S. PATENT DOCUMENTS

2004/0235544 A1    11/2004  Horigami et al.
2016/0093140 A1*   3/2016   Nelson .................. G07F 17/326
                                              463/20

FOREIGN PATENT DOCUMENTS

JP     H10-66784 A     3/1998
JP     3483252 B1      1/2004
JP     2005-185727 A   7/2005

OTHER PUBLICATIONS

Honey Flows game Oct152014.pdf, https://web.archive.org/web/20141015012140/http://www.didigames.com:80/honey-flows.html, published on Oct. 15, 2014, last accessed on Jun. 29, 2017.*

(Continued)

*Primary Examiner* — William H McCulloch, Jr.
*Assistant Examiner* — Yingchuan Zhang
(74) *Attorney, Agent, or Firm* — Muncy, Geissler, Olds & Lowe, P.C.

(57) ABSTRACT

An information processing apparatus erases, on the basis of a chained state of a plurality of pieces arranged on a game field, the pieces in the chained state. The arrangement of the pieces in the game field is controlled such that, in a predetermined region on the game field, an odd number of pieces and an even number of pieces are alternately arranged on imaginary lines in an advancing direction on the game field. For example, the information processing apparatus erases a serial piece group formed as a chain by determining, starting from operation for any one piece on the imaginary line corresponding to a frontmost row among the imaginary lines, whether a piece of a same kind as the one piece is present in left and right pieces adjacent to the one piece present on a next imaginary line in the advancing direction from the operated one piece.

10 Claims, 13 Drawing Sheets

ADVANCING DIRECTION

(56) References Cited

OTHER PUBLICATIONS

Honey Flows game—play to show path selection and erasing.pdf, screen shots from playing the honey flows game at http://www.didigames.com/honey-flows.html, last played on Jun. 29, 2017.*

* cited by examiner

ADVANCING DIRECTION

INFORMATION PROCESSING APPARATUS AND PROCESSING METHOD

BACKGROUND OF THE INVENTION

Field of the Invention

The present invention relates to an information processing apparatus and a processing method therefor that add, taking chain formation of puzzle pieces as an opportunity, a point and give damage to an enemy character or the like to advance a game.

Description of the Related Art

As a game application developed using a puzzle as a motif, there have been developed a large number of games that, for example, change the direction of or move one or more puzzle pieces (referred to as "pieces" or "blocks" as well), which are generated on a game field and move in a predetermined direction, to form, for example, a chain of pieces of the same color, perform erasing processing and perform addition processing of a point of a player for the formed chain pieces and, in the case of game progress of a battle type, perform processing for giving damage to an enemy to amuse players.

For example, for the purpose of proposing a new puzzle game, there has been proposed, for example, a moving method of an object in a game in which continuously joined objects of the same kind (corresponding to puzzle pieces) are erased (Japanese Patent Application Laid-Open No. H10-66784 (Patent Literature 1)).

That is, Patent Literature 1 discloses a puzzle game including a moving step for moving large balls of various colors sequentially displayed on a screen from a lower part to an upper part on the screen, a first discriminating step for discriminating whether a leading portion reaches the upper part on the screen, an ending step for ending the game when it is discriminated in the discriminating step that the leading portion reaches the upper part on the screen, a second discriminating step for discriminating whether the large balls of the same color form a specific array, an erasing step for erasing all the large balls when it is discriminated in the second discriminating step that the large balls of the same color form the array, a moving step for, when a large ball or a small ball is present ahead of the large balls erased in the moving direction, moving the ball downward, and a replacing step for moving a ball for replacement according to operation of a controller and replacing a ball moving on the screen with the ball for replacement.

There has also been proposed a game apparatus or the like that increases difficulty of thought and analysis of a player in a battle type game in which a block group moves in a predetermined direction (Japanese Patent Application Laid-Open No. 2005-185727 (Patent Literature 2)).

That is, Patent Literature 2 discloses a game apparatus including a display unit on which a first game field including a plurality of block display regions, a second game field including a plurality of block display regions, and blocks are displayed, a first operation unit for inputting an operation command for the block displayed in the first game field in the display unit, and a control unit that receives the operation command in the first operation unit and controls block display in the first and second game fields of the display unit. The control unit includes connected-block erasing means for erasing and displaying the predetermined blocks on the basis of a connected state of predetermined blocks in the first game field and attack-block display means for displaying, instead of at least one block displayed in the second game field, an attack block having a resistance value based on the number of blocks erased in a predetermined time from a block erasing time by the connected-block erasing means.

There has also been proposed a game program that uses a block arrangement space (a puzzle) for the purpose of diversifying abilities of characters with equipment such as arms and protectors (Japanese Patent No. 3483252 (Patent Literature 3)).

That is, Patent Literature 3 discloses a game program for causing a computer to execute an arm, item, protector, and special ability equipping procedure for equipping characters with arms, items, protectors, and special abilities, which can be acquired in a game world, on the basis of an instruction from a player via a controller of the computer and a scenario developing procedure for giving abilities defined by the arms, the items, the protectors, and the special abilities equipped in the characters by the arm, item, protector, and special ability equipping procedure and developing the following scenario on the basis of the characters that have obtained the given abilities. The arm, item, protector, and special ability equipping procedure includes a block-arrangement-space setting procedure for setting, in a predetermined memory, a block arrangement space having a plurality of block arrangement spaces having fixed shapes in forms set in a virtual space in forms corresponding to the characters, a block converting/displaying procedure for converting an item acquired during a game by a player into a skill block corresponding to the arm, the item, the protector, and the special ability having a size and a shape corresponding to the item, generating an image of the skill block, and displaying the image on a display, a skill-block incorporating/arranging procedure for commanding to incorporate and arrange, according to a command of the controller of the computer, the converted skill block in a block arranging space in the block arrangement space as an object in the virtual space, an interference determining procedure for calculating and determining presence or absence of interference of an incorporating position of the skill block commanded by the skill-block incorporating/arranging procedure and the skill block already incorporated in the block arrangement space and, when the interference occurs, notifying the player of the interference, a block-arrangement-space display procedure for generating a video indicating an arrangement state of the skill block in the block arrangement space and displaying the video on the display, and an arm, item, protector, and special ability totalizing/equipping procedure for calculating, concerning the characters, the arms, items, the protectors, and the special abilities corresponding to all the skill blocks arranged in the block arrangement space concerning the characters and equipping the characters with the arms, the items, the protectors, and the special abilities.

However, in such game specifications for giving points and damage to an enemy taking the chain formation of the puzzle pieces as an opportunity, as interest is increased, a sense of speed tends to be reduced. Further, even if continuous linking of pieces of the same kind (forming a chain of pieces) is a condition for erasing the chained pieces, when a process of chain formation is linear or a collection of a group of pieces, a chaining process of the pieces is easily predicted. This is conspicuous for those skilled in a game a little. On the other hand, simplicity for enabling a beginner of the game to get accustomed to the game is also necessary. From such a viewpoint, there has been room for improvement in order to maintain or promoting interest of the game. That is, a processing technique is expected that improves the sense of speed of the game under simple operation in the chaining process of the pieces and is richer in variety (unexpectedness of chaining).

Further, a processing technique is expected that, concerning rearrangement of the pieces and filling of new pieces after the erasing of the chained pieces, not by the easily predictable method in the past, further varies actions of the pieces and, even when a piece group on a game field is seen as a unit, derives the piece group to perform motions rich in speed and unexpectedness of chaining.

SUMMARY OF THE INVENTION

Therefore, an information processing apparatus according to an embodiment of the present invention is an information processing apparatus that erases, on the basis of a chained state of a plurality of pieces arranged on a game field formed by operation for one piece among the plurality of pieces, the plurality of pieces in the chained state. The arrangement of the plurality of pieces arranged in the game field is controlled such that, in a predetermined region on the game field, an odd number of pieces and an even number of pieces are alternately arranged on a plurality of imaginary lines arranged in an advancing direction on the game field.

Processing for erasing the plurality of pieces includes:

(A) determining, starting from operation for any one piece among the plurality of pieces on the imaginary line corresponding to a frontmost row among the plurality of imaginary lines, whether a piece of the same kind as the one piece is present in left and right pieces adjacent to the one piece present on the next imaginary line in the advancing direction from the operated one piece, (B) when it is determined by the determination that the piece of the same kind as the one piece is present, determining whether a piece of the same kind as the piece of the same kind is present in left and right pieces adjacent to the piece of the same kind present on the next imaginary line in the advancing direction viewed from the piece of the same kind, (C) when the processing shifts to the processing (B) according to the determination of the processing (A), repeating the processing (B) until it is determined that the piece of the same kind is absent, and (D) processing, as a target of erasing, a serial piece group formed as a chain by the processing (A) to (C).

A processing method according to an embodiment of the present invention is a processing method for causing an information processing apparatus with a display to erase, on the basis of a chained state of a plurality of pieces arranged on a game field in the display formed by operation for one piece among the plurality of pieces, the plurality of pieces in the chained state from the display. When being executed on the information processing apparatus, the processing method causes the information processing apparatus to control the arrangement of the plurality of pieces arranged in the game field such that, in a predetermined region on the game field, an odd number of pieces and an even number of pieces are alternately arranged on a plurality of imaginary lines arranged in an advancing direction on the game field.

In erasing the plurality of pieces from the display, the processing method causes the information processing apparatus to execute:

(A) a processing step for determining, starting from operation for any one piece among the plurality of pieces on the imaginary line corresponding to a frontmost row among the plurality of imaginary lines, whether a piece of the same kind as the one piece is present in left and right pieces adjacent to the one piece present on the next imaginary line in the advancing direction from the operated one piece, (B) a processing step for, when it is determined by the determination that the piece of the same kind as the one piece is present, determining whether a piece of the same kind as the piece of the same kind is present in left and right pieces adjacent to the piece of the same kind present on the next imaginary line in the advancing direction viewed from the piece of the same kind, (C) a processing step for, when the processing shifts to the processing (B) according to the determination of the processing (A), repeating the processing (B) until it is determined that the piece of the same kind is absent, and (D) a processing step for processing, as a target of erasing, a serial piece group formed as a chain by the processing (A) to (C).

The information processing apparatus and the like according to the embodiments of the present invention attain a special effect that it is possible to make a chain forming process of puzzle pieces full of a sense of speed like an action game and it is possible to amuse players more than ever through motions rich in unexpectedness and changes.

DETAILED DESCRIPTION OF THE PREFERRED EMBODIMENTS

An information processing apparatus and a game program according to an embodiment of the present invention are explained in detail with reference to the drawings.

Figure 1:
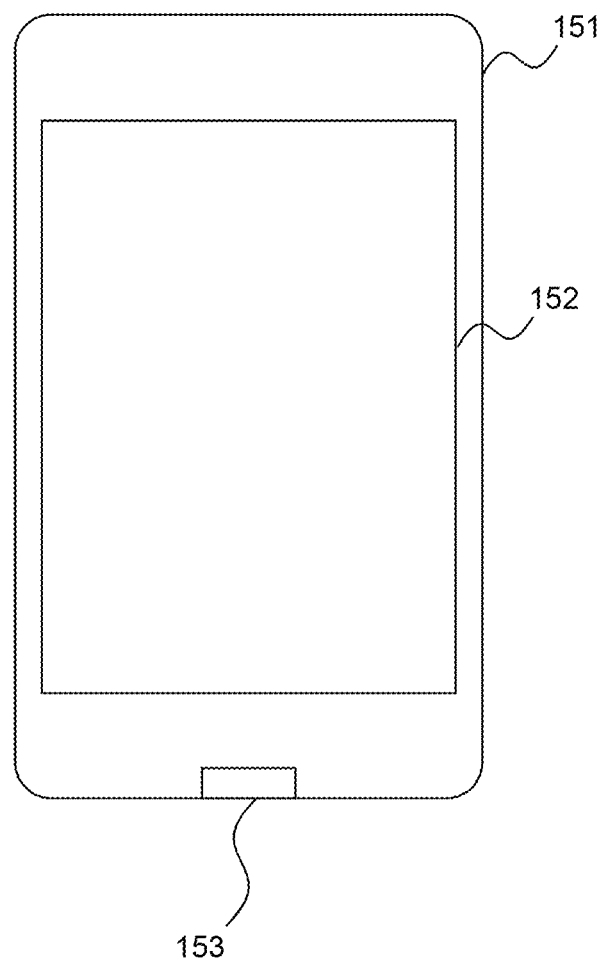
FIG. 1 is an explanatory diagram for explaining the exterior configuration of an information processing apparatus according to an embodiment of the present invention.

In FIG. 1, the exterior configuration of a tablet terminal functioning as the information processing apparatus according to the embodiment of the present invention is shown. In FIG. 1, an information processing apparatus (a tablet terminal) 15 includes a housing section 151, a display 152, and a hardware button 153 provided in the lower center portion of the housing section 151. The display 152 is typically configured by a liquid crystal display (LCD) or the like. The display 152 can display various kinds of information such as characters, a still image, and a moving image. A menu button or a software keyboard can be displayed on the display 152. The menu button or the software keyboard can be touched by a finger, a touch pen (not shown in the figure) or the like to give an instruction (a command) to the tablet terminal 15. In this regard, the hardware button 153 is not an essential component. However, for convenience of explanation of the present invention, the hardware button 153 is mounted as a button for performing a fixed function. Naturally, the hardware button 153 can be substituted by a menu button displayed in a part of the display 152.

The display 152 includes a multi-touch input panel. A touch input position coordinate on the touch input panel is transmitted to a processing system (a CPU) of the tablet terminal 15 via an input device interface (not shown in the figure) and processed. The multi-touch input panel is configured to be capable of simultaneously detecting a plurality of contact points on the panel. The detection (a sensor) can be realized by various methods. The sensor is not always limited to a contact sensor. For example, it is also possible to extract a pointed point on the panel using an optical sensor. Further, as the sensor, it is also possible to use a sensor of a capacitance type that detects contact of a human skin besides the contact sensor and the optical sensor.

Although not shown in FIG. 1, the tablet terminal 15 can include a microphone and a speaker. In this case, it is also possible to discriminate voice or the like of a user picked up by the microphone and use the voice or the like as an input command. Further, although not shown in FIG. 1, a camera device such as a CMOS is mounted on the back or the like of the tablet terminal 15.

Figure 2:
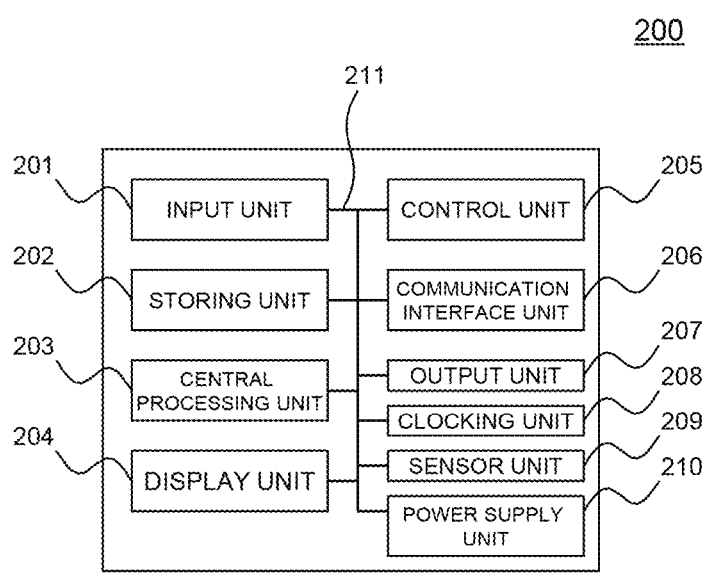
FIG. 2 is an explanatory diagram for explaining functional blocks of the information processing apparatus according to the embodiment of the present invention.

In FIG. 2, a functional block diagram of hardware configuring the tablet terminal 15 according to the embodiment of the present invention is illustrated. The operation of the table terminal 15 is realized by respective operations of the hardware and a cooperative operation of software and the hardware explained below.

In FIG. 2, a tablet terminal 200 functioning as an entire hardware block roughly includes the hardware button 153 and the multi-touch input panel provided in the display 152 in FIG. 1, an input unit 201 configured by a microphone or the like, a storing unit 202 configured by a hard disk, a RAM and/or a ROM, and the like for storing computer programs, data, and the like, a central processing unit 203 configured by a CPU that performs various numerical value calculations and logic operations according to computer programs, a display unit 204 configured by a display 152 or the like, a control unit 205 for performing control of chips, an electric system, and the like, a communication interface unit 206 configured by a slot for accessing the Internet, a port for performing optical communication, and a communication interface, an output unit 207 such as a speaker or vibration, a clocking unit 208 for clocking time and the like, a sensor unit 209 including an image sensor such as a CMOS, and a power supply unit 210 for supplying electric power to modules in the apparatus. These modules are connected by a communication bus or a power feed line (in FIG. 2, for convenience, collectively shown as a connecting wire 211 divided into lines as appropriate) as appropriate according to necessity.

Note that a GPS sensor module for specifying a position of the tablet terminal 200 (15) may be included in the sensor unit 209. A signal detected by the image sensor such as the CMOS configuring the sensor unit 209 can be processed as input information in the input unit 201.

A computer program or software necessary for implementation of the present invention is usually installed or stored in a hard disk drive or the like configuring the storing unit 202. When the computer program or the software is executed, the entire or a part of the computer program or the software is read out to the memory in the storing unit 202 as a software module according to necessity. An arithmetic operation of the computer program or the software is executed in the CPU 203.

Note that the arithmetic operation does not always need to be executed in the central processing unit 203 such as the CPU. An auxiliary arithmetic device such as a not-shown digital signal processor (DSP) can also be used.

Figure 3:
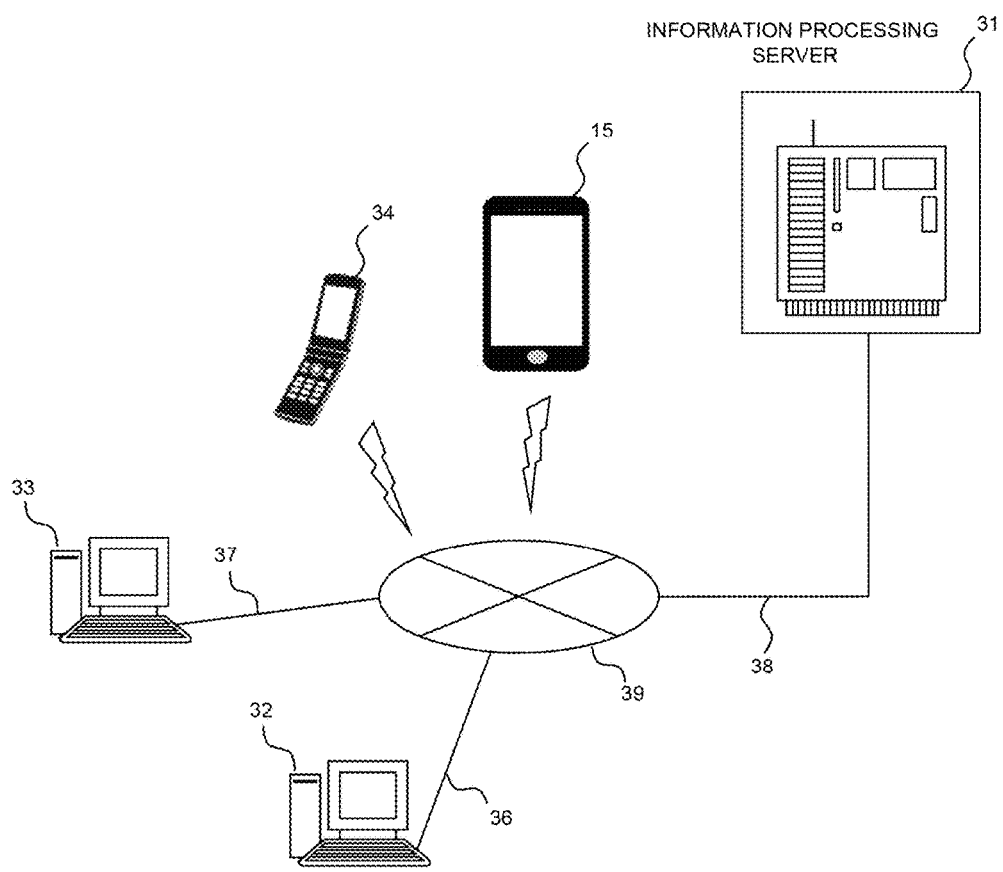
FIG. 3 is an explanatory diagram for explaining an overall configuration example of a system including the information processing apparatus according to the embodiment of the present invention.

In FIG. 3, the information processing apparatus according to the embodiment of the present invention is connected to a server or a system and used. An overall configuration example of the system is shown in FIG. 3. A characteristic processing operation of the present invention can be carried out by the information processing apparatus alone. However, the present invention is not limited to this. The processing operation can also be carried out after connecting the information processing apparatus to an information processing server and a game server. In this case, at least a part of a processing routine, which can be executed by the information processing apparatus alone as well, is carried out by the server. Information concerning a player who operates the information processing apparatus and data such as a point are sometimes stored and managed in the server. A form in which the information processing apparatus connected to the server functions as the entire system and implements the embodiment of the present invention is explained with reference to FIG. 3.

As shown in FIG. 3, an information processing system 30 is configured by, as minimum components thereof, an information processing server 31 and various information processing apparatuses used by a player (in the figure, PCs 32 and 33, a cellular phone 34, and the portable information terminal or tablet terminal 15 are illustratively shown; in the following explanation, collectively referred to as "terminals" as well). The server and the various terminals are communicably connected to each other by dedicated lines and public likes such as the Internet (wired lines 36 to 38) as shown in FIG. 3. The lines may be wired or may be radio. In the case of radio, the cellular phone 34 and the portable information terminal or the tablet terminal 15 are linked up to the Internet 39 by radio via a base station, a radio router, and the like not shown in the figure and are communicably connected to the information processing server 31 via the line 38.

Note that, at the point of the filing of this application, many cellular phones and portable information terminals or tablets include processing abilities (communication processing speeds, image processing abilities, etc.) comparable to personal computers (PCs) and should be considered as small computers.

The computer program or the software necessary for carrying out the present invention is usually installed or stored in a HDD, an SSD, or the like in the storing unit of the PC or the portable information terminal. When the computer program or the software is executed, the entire or a part of the computer program or the software is read out to the memory in the storing unit as a software module according to necessity. An arithmetic operation is executed in the CPU.

Note that the arithmetic operation does not always need to be executed in the central processing unit such as the CPU. An auxiliary arithmetic device such as a not-shown digital signal processor (DSP) can also be used.

As the hardware configuration of the information processing server 31, a PC can be basically adopted. Note that the present invention is not limited to this. However, when hardware specifications of the information processing server 31 are improved according to necessity, it is possible to adopt a configuration suitable for processing of large-size data by actuating a plurality of PCs (as an example, several tens to several tens of thousands PCs) in parallel.

The operations of the system including the information processing apparatus and the information processing apparatus (the user terminal) or the game program according to the embodiment of the present invention are explained with reference to operation flows or flowcharts of FIGS. 4 and 5.

As explained above, the characteristic operation of the present invention can be carried out by the information processing apparatus alone and at least a part of the operation can be carried out by the server such as the information processing server.

Figure 4:
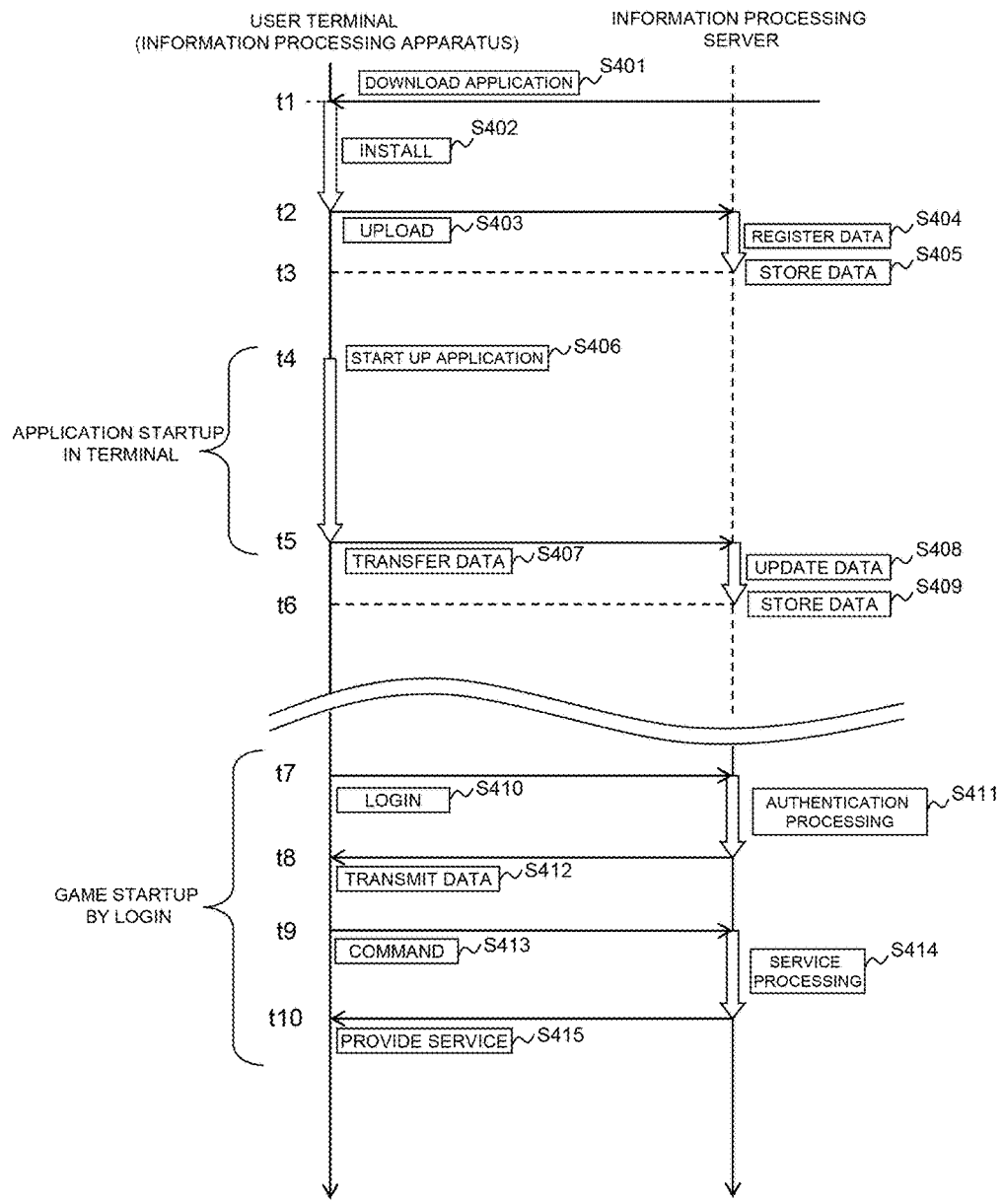
FIG. 4 is an explanatory diagram for explaining an operation example of the system including the information processing apparatus according to the embodiment of the present invention.

FIG. 4 shows an overview of an overall operation flow of the system including the information processing apparatus in the embodiment of the present invention. In FIG. 4, the "user terminal" is the information processing apparatus. Besides the tablet terminal 15 shown in FIG. 1, PCs 12 and 13, a cellular phone 14, and the like shown in the figure correspond to the "user terminal". The information processing server 31 shown in FIG. 3 corresponds to the "information processing server". In FIG. 4, t1 to t10 indicate a flow in time series. Operations and processing explained below are performed over time.

First, at time t1, the user (the player) downloads, from the information processing server via the user terminal, application software for causing the user terminal of the user to operate as the information processing apparatus according to the present invention (step S401). The application software is client software or application software for processing a part or the entire computer program according to the present invention. The user installs the downloaded application software in the user terminal (step S402). At this point, at time t2, the user can also upload, besides a mail address of the user, profile information shown in the following table to the information processing server from the user terminal as user registration according to necessity (step S403) and cause the information processing server to register and manage the profile information (step S404).

TABLE 1

| Name (Nickname) | Membership number (ID) | Mail address (Cellular phone number) | Sex | Age (demographic) | Residential area | Hobbies (Tastes) |
| --- | --- | --- | --- | --- | --- | --- |

The above data items are stored on the information processing server as user data (step S405). At time t3 and subsequent time, the user (the player) can start a game by operating the information processing apparatus.

Subsequently, the user, who has downloaded and installed the application in the user terminal, starts up the application software at time t4 (step S406). At time t4 to time t5, illustratively, the user enjoys a game play in the information processing apparatus (the terminal).

At time t5, the user once suspends or ends the application software according to the embodiment of the present invention. At this point, according to necessity, the user transfers status information of the application (various kinds of parameter information necessary for resuming or continuing the game such as a score and presence or absence of level-up, authority data of usable contents involved in the level-up, or information representing a state of the game such as reached stage information) to the information processing server (step S407). The server receives the status information and updates (step S408) and stores (step S409) the status information serving as user information of the user. In FIG. 4, these kinds of processing are completed by time t6.

Note that, after the application software according to the embodiment of the present invention is installed in the information processing apparatus, it is naturally possible to adopt a form in which the application software can be executed in a completely closed manner on the terminal. In this case, steps S404 and S405 and steps S408 and S409 explained above can be omitted. If necessary information is present, the information is stored and managed on the memory of the terminal.

In FIG. 4, at time t7 to time t10, an implementation form example in carrying out at least a part of the application software according to the embodiment of the present invention in the information processing server is shown. In this case, the user (the player) performs two kinds of typical user terminal operation, i.e., a login operation and command transmission and receives necessary data transmission or receives service provision from the information processing server.

For example, in FIG. 4, at time t7, the user performs login processing to the server via the information processing apparatus of the user (step S410). Then, the information processing server performs necessary authentication processing as appropriate (step S411). At time t8, the information processing server transmits data for enabling the user to receive service provision (step S412). The data is, for example, a top menu screen configured to be capable of receiving a command from the terminal, a startup screen of an application, or the like.

At time t9, the user transmits some command via the information processing apparatus (step S413). The command may be selection of a menu displayed on the menu screen or, on the application startup screen, is sometimes a start command for starting the application. The server receives the command and starts service processing (step S414). At time t10, a service corresponding to a request from the terminal is provided from the server (step S415).

Note that, although not shown in FIG. 4, after time t10, the terminal can transmit a command at any time (e.g., an operation command during the game application execution). Every time the command is transmitted, the server can receive the command from the terminal and provide a service (e.g., receives an operation command during the game application execution and moves a target object or performs other arithmetic processing).

Besides, additionally, as an example, the user (the player) can also transmit a message to a specific partner or an unspecified large number of partners from the user terminal (not shown in FIG. 4). The message is relayed by the information processing server, transferred to the specific partner or the unspecified large number of partners, and received by the partner(s). The user can check the transmitted message in the terminal of the user. Such a communication tool is, so to speak, an option and can be implemented according to necessity.

An overview of a processing operation according to the embodiment of the present invention in the user terminal is explained with reference to FIG. 5 in a form partially overlapping the flow explained with reference to FIG. 4. FIG. 5 is a more detailed processing flow of a part of the operation at time t4 (step S406) to time t5 (step S407) in FIG. 4. A basic operation of the game application according to the embodiment of the present invention is explained.

Figure 5:
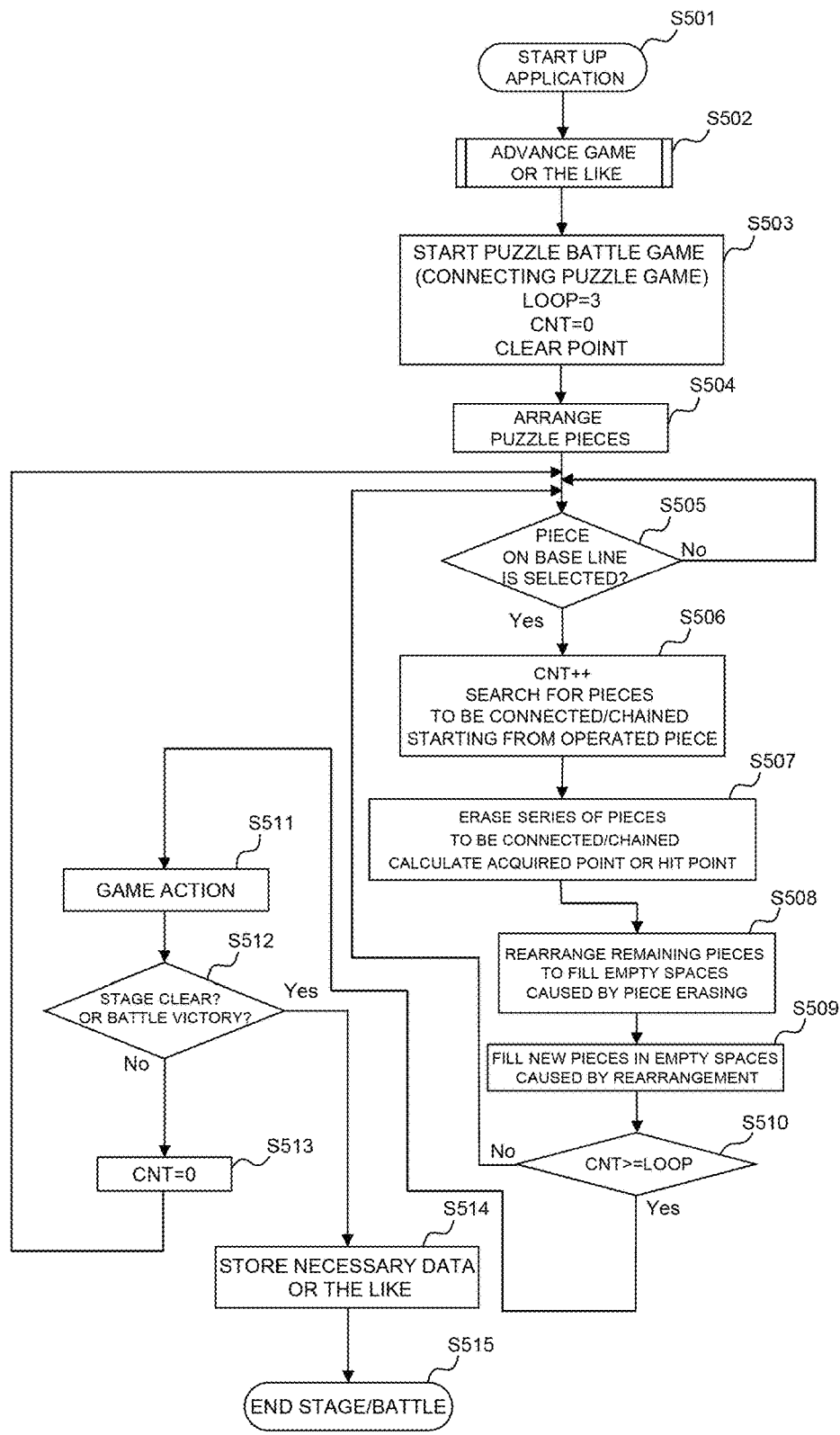
FIG. 5 is an explanatory diagram for explaining an operation example of the information processing apparatus or a game program according to the embodiment of the present invention.

Note that, in the flow shown in FIG. 5, the game application can be carried out to calculate an acquired point or a hit point every time a piece chain is formed and determine stage clear or battle victory. However, the game application can be carried out to determine stage clear or battle victory on the basis of a cumulative acquired point or a cumulative hit point in a set of a predetermined number of times (e.g., three times) of piece chain formation. In an example explained below, the predetermined number of times is three times. When the processing operation is set in this way, it is possible to perform game advance to cause three characters to appear in a battle game or the like, add up attacks of the characters (piece chaining of one time for each of the characters) (add up points by piece chaining of three times), and determine whether an enemy has been able to be defeated.

First, in step S501, the user starts the application. Subsequently, although the present invention is not limited to this, the game application according to the embodiment of the present invention (details are explained with reference to FIGS. 6 to 13) can also be carried out as a part of a plurality of other games. The game application can be carried out as, for example, a battle game in a role playing game (RPG) or a bonus game in a card simulation game. Step S502 represents this point. In this specification, explanation of details of step S502 is omitted because step S502 is not an essence of the present invention.

Subsequently, in step S503, a predetermined number of times LOOP and a variable CNT for counting the number of times are initialized (LOOP is set to 3 and CNT is set to 0), a point is cleared, and the game application according to the embodiment of the present invention is started up or started.

The game application according to the embodiment of the present invention is typically carried out in a form of a puzzle battle game. However, the present invention is not always limited to this. The game application can also be carried out as a connecting puzzle game or the like not based on a battle.

In this specification, pieces or blocks forming a puzzle are referred to as "puzzle pieces" or simply referred to as "pieces".

In step S504, a plurality of puzzle pieces are arranged on a game field set in the display of the information processing apparatus. A method of arranging the puzzle pieces has a first feature of the present invention. That is, the puzzle pieces are controlled such that an odd number of pieces and an even number of pieces (or an even number of pieces and an odd number of pieces) are alternately arranged on stages of a plurality of imaginary lines set on the game field. As a result, the puzzle pieces are controlled to be always arranged in zigzag when the puzzle pieces arranged on the imaginary lines on the game field are viewed along an advancing direction that vertically traverses the imaginary line and the imaginary line.

According to such arrangement control, it is possible to cause actions rich in changes that the player cannot easily predict when rendering explained below is performed.

As the puzzle pieces arranged on the game field, a plurality of kinds of puzzle pieces can be prepared. Typically, variations of pieces by color-coding such as blue, red, and green are prepared. Such color-coding serves as a determination standard for piece chain formation explained below.

Although the present invention is not limited to this, for convenience of explanation, five kinds of color-coded pieces, "red", "blue", "yellow", "green", and "orange" are prepared.

Further, in the embodiment of the present invention, pieces of "white" or "seven colors (rainbow)" are prepared and adopted as "specific pieces" that can form a chain with any color-coded pieces.

The puzzle pieces arranged on the game field can be generated at random on the basis of a random number or the like generated by the CPU or the like of the information processing apparatus, generated tendentiously by, for example, multiplying the puzzle pieces with a predetermined coefficient according to a predetermined game progress scenario, or managed as an array or a list on the memory of the apparatus.

Further, it is possible to cause the information processing apparatus to perform search processing or arithmetic processing on the basis of operation by the user and perform update processing of an arrangement relation of the pieces (details of these kinds of processing are explained below with reference to FIGS. 6 to 13).

In step S505, the game application waits for operation from the player (represented as a loop of "No" in step S505). A piece that the player can operate is one of the pieces arranged on the frontmost imaginary line viewed from the player among the plurality of imaginary lines arranged on the game field (referred to as "base line" as well).

When operation (selection or pointing) from the player is received (Yes) in step S505, the game application proceeds to step S506.

In step S506, the CNT is incremented. Starting from the piece operated (selected or pointed) by the player in step S505, the game application scans or searches for the pieces arranged on the game field in the advancing direction to extract connected or chained pieces (generate a list of chained pieces).

Pieces or specific pieces having a color same as the color of the piece at the start point are processed as pieces to be connected or chained. A group of pieces to be connected or chained are typically managed by being stored in an array or a list separately secured on the memory.

When generally finishing extracting the group of pieces to be connected or chained in step S506, the game application proceeds to step S507.

In step S507, the game application performs erasing processing of the group of pieces to be connected or chained. At this point, the group of pieces set as an erasing target among the pieces managed as the array or the list is erased or a display flag of the group of pieces is turned off (when flag management is performed, the group of pieces can be restored when some situation occurs). An acquired point or a hit point against an enemy is calculated on the basis of the group of pieces to be connected or chained extracted in step S506 and is added up according to necessity (an addition result may be naturally displayed on the display).

The game application proceeds to step S508. In step S508, the game application performs rearrangement processing of the remaining pieces to fill empty spaces on the game field caused by the erased group of pieces (details are explained below with reference to FIGS. 10 to 12).

Subsequently, the game application proceeds to step S509, performs processing for filling new pieces in final empty spaces caused by the rearrangement processing in the preceding step (details are explained below with reference to FIG. 12), and proceeds to step S510.

In step S510, it is determined whether the CNT has reached the LOOP (the predetermined number of times). At points in time of CNT=1 and 2, since it is determined that the CNT has not reached the LOOP (No), the game application returns to step S505.

When it is determined in step S510 that the CNT has reached the LOOP (the predetermined number of times) (Yes), the game application proceeds to step S511 and carries out a game action such as rendering representing a state in which damage is given to the enemy. The game application proceeds to S512. It is determined referring to a cumulative acquired point, a cumulative hit point, or the like added up to the preceding step whether a game currently in progress has reached a fixed degree of progress (i.e., has reached a cumulative point or the number of erased pieces that should be considered stage clear or has reached a cumulative hit point enough for recognizing that the enemy is defeated).

In the case of "YES" at step S512, the game application proceeds to step S514. For example, the game application appropriately stores data necessary for game resumption or continuation and ends the stage or the battle (step S515). Thereafter, the game application may shift to the next stage and advance the same game. Alternatively, when the game related to this flow is carried out as a part of another role playing game or the like in step S502, the game application may return to the other role playing game or the like.

On the other hand, in the case of "No" in step S512, the game application proceeds to step S513, resets the CNT once (CNT=0), and returns to step S505.

Note that, in the above explanation, the LOOP (the predetermined number of times) is set to "3". However, the present invention is not limited to this. Any natural number equal to or larger than 1 can be set as the LOOP.

The flow explained above with reference to FIG. 5 is a basic operation of the game application according to the embodiment of the present invention.

Figure 6:
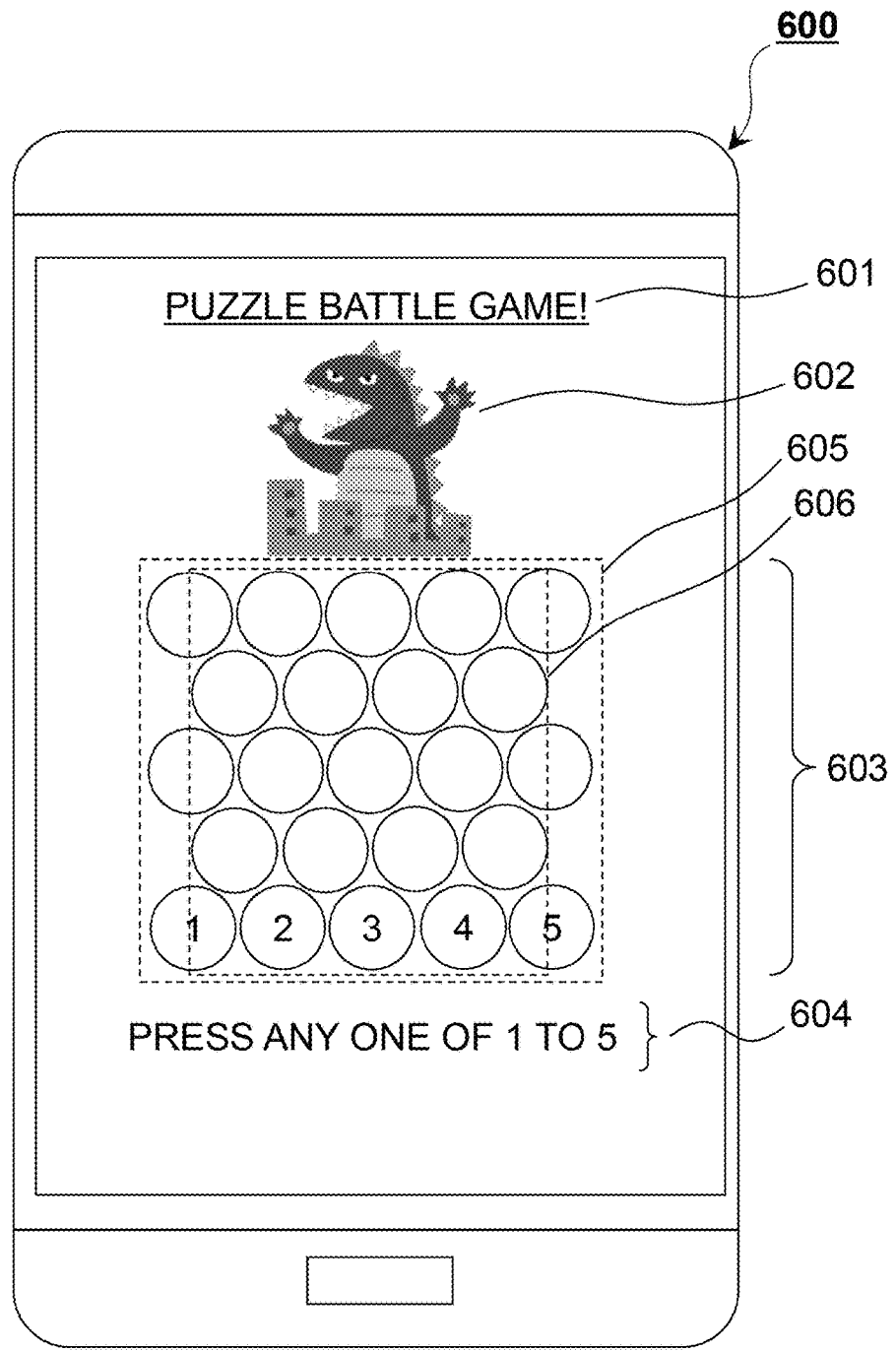
FIG. 6 is an explanatory diagram for explaining a screen example (an arrangement example of pieces) of the information processing apparatus according to the embodiment of the present invention.

A screen example (an arrangement example of pieces) of the information processing apparatus according to the embodiment of the present invention is shown in FIG. 6. The screen example is a specific example of the screen in step S504 of FIG. 5.

In FIG. 6, a game title 601 and an image 602 assuming an enemy that should be defeated are illustratively displayed on a display of an information processing apparatus 600. A plurality of pieces are arranged in a game field 603. A hint 604 in game progress (a note "please press any one of 1 to 5") is displayed in a bottom stage of the display.

In particular, in the game field 603, five pieces allocated with numbers 1 to 5 are arranged on a base line. Four pieces are arranged on an imaginary line above the base line. Five, four, and five pieces are arranged in order in an advancing direction (in the figure, an upward direction toward the image 602 of the enemy). Further, pieces on imaginary lines are arranged to be zigzag one another rather than linearly along the advancing direction.

Note that, in FIG. 6, for convenience of explanation of a feature of the present invention (the pieces are arranged in zigzag in the advancing direction on the game field), an odd number of pieces and an even number of pieces are represented as being arranged on the imaginary lines. However, it is possible to arrange only the odd number of pieces or the even number of pieces on the imaginary lines to be "zigzag". Even in that case, the essence of the present invention is not spoiled (e.g., FIGS. 7B and 7C).

Definition of a "Predetermined Region" on the Game Field

Therefore, as a diversified definition for more strictly specifying the feature of the present invention, a predetermined region on the game field in this specification is defined as "a rectangular region having width in which pieces on a certain imaginary line just fit". It is possible to characterize the present invention in that the "number of pieces completely fitting" in the rectangular region is alternately an odd number and an even number (or an even number or an odd number) for each of imaginary lines. Note that a difference between the even number and the odd number is typically "1".

In such a meaning, in FIG. 6, the predetermined region on the game field, which is the rectangular region, is represented by a broken line 605 or 606. In this case, when the predetermined region on the game field is set to width in which five pieces just fit, the broken line 605 is adopted as the predetermined region on the game field. As shown in the figure, "five, four, five, four, and five" pieces are alternately arranged in order from the base line in the predetermined region (a difference between the odd number and the even number is 1). On the other hand, when the predetermined region on the game field is set to width in which four pieces just fit, the broken line 606 is adopted as the predetermined region on the game field. As shown in the figure, "three, four, three, four, and three" pieces are alternately arranged in order from the base line in the predetermined region (a difference between the odd number and the even number is 1).

The significance of the relation explained above does not change even on modified game fields explained with reference to FIGS. 8A to 8D (the predetermined region on the game field, which is the rectangular region in FIGS. 6 and 7A to 7C, only changes to predetermined regions on the game field modified along modified imaginary lines and advancing direction lines perpendicular to the imaginary lines in FIGS. 8A to 8D).

Although not shown in FIG. 6, colors (as an example, "red", "blue", "yellow", "green", "orange", and "rainbow") selected at random are typically added to the pieces on the game field.

Note that the note of the numbers 1 to 5 on the five pieces on the base line and the hint 604 in the game progress can be omitted as appropriate.

Illustratively, the game is started by selecting or pointing any one of the five pieces on the base line shown in FIG. 6.

Figure 7A:
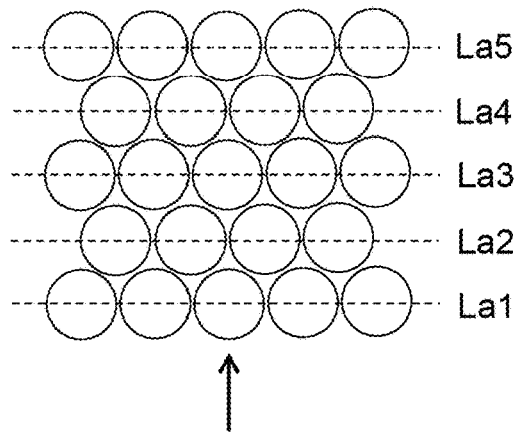
FIGS. 7A to 7C are explanatory diagrams for explaining screen examples (variations of arrangement of pieces) of an information processing apparatus according to another embodiment of the present invention.
Figure 7B:
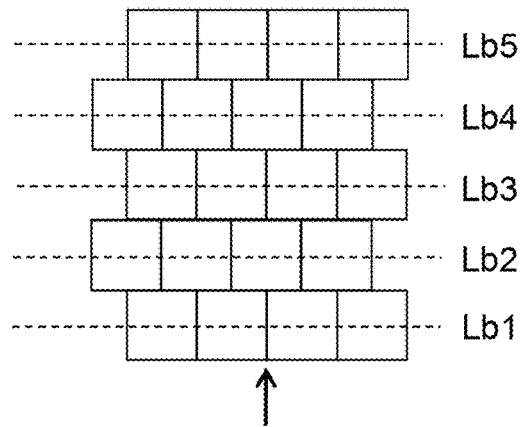
Figure 7C:
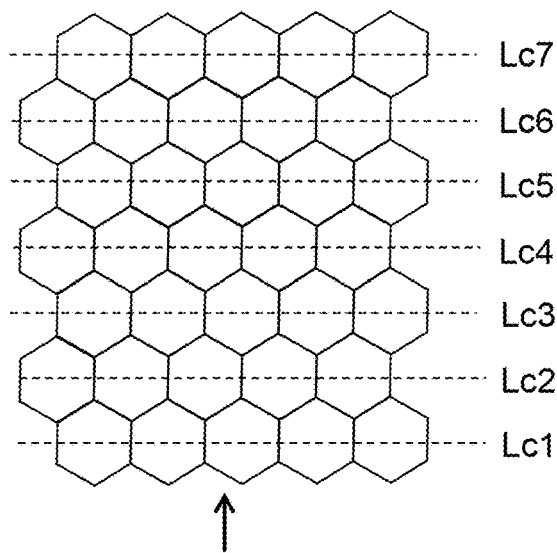

In FIGS. 7A to 7C, screen examples (variations of arrangement of pieces) of an information processing apparatus according to another embodiment of the present invention are shown. In FIG. 6, circular pieces are adopted. This is a form shown in FIG. 7A. In FIG. 7A, illustratively, five pieces are arranged on a base line La1 and, in an advancing direction (a direction of an arrow in the figure), four pieces are arranged on an imaginary line La2, five pieces are arranged on an imaginary line La3, four pieces are arranged on an imaginary line La4, and five pieces are arranged on an imaginary line La5.

Besides the circular pieces shown in FIG. 7A, pieces of various shapes such as rectangular pieces (FIG. 7B) and regular hexagonal pieces (FIG. 7C) can be adopted without departing from the spirit of the present invention.

As the numbers of pieces arranged on imaginary lines, any numbers can be adopted as illustrated in the figures. Note that, in the piece arrangement shown in FIG. 7B, the number of pieces on each of the imaginary lines Lb1 to Lb5 is four. In the piece arrangement shown in FIG. 7C, the number of pieces on each of the imaginary lines Lc1 to Lc7 is five. However, if the definition of the "predetermined region on the game field" explained above is applied, it is evident that FIGS. 7B and 7C are only variations according to the other embodiment of the present invention.

In FIGS. 8A to 8D, screen examples (variations of arrangement of pieces) of the image processing apparatus according to still another embodiment of the present invention are shown. In FIGS. 6 and 7A to 7C, examples are shown in which the pieces are arranged on a plane including the game field. However, the present invention is not limited to the examples. As shown in FIGS. 8A to 8D, an arrangement surface of pieces may be three-dimensionally set and the pieces may be arranged on a plurality of imaginary lines (naturally, nonlinear modified lines) assumed on the arrangement surface.

Figure 8A:
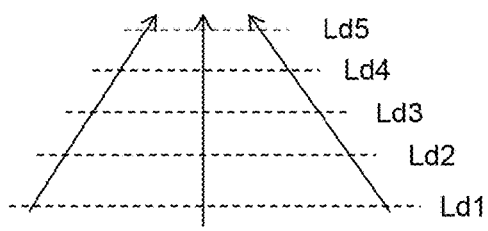
FIGS. 8A to 8D are explanatory diagrams for explaining screen examples (variations of arrangement of pieces) of an information processing apparatus according to still another embodiment of the present invention.

In FIG. 8A, the plane including the game field is drawn on a display of the information processing apparatus on the basis of a one-point perspective drawing method. A base line Ld1 and other imaginary lines Ld2 to Ld5 are also assumed according to the drawing method. The pieces are arranged on the imaginary lines assumed in this way. Three arrows indicate an advancing direction.

Figure 8B:
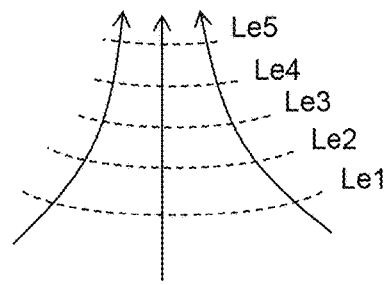

In FIG. 8B, the plane including the game field is drawn as a curved surface and stereoscopically drawn by perspective. A base line Le1 and other imaginary lines Le2 to Le5 are also assumed according to the perspective. The pieces are arranged on the imaginary lines assumed in this way. Three arrows indicate an advancing direction.

Figure 8C:
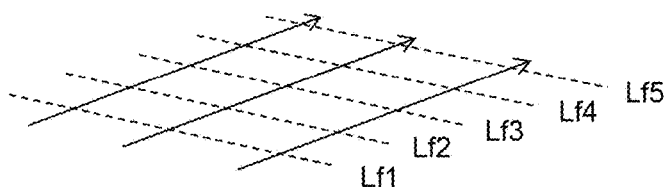
Figure 8D:
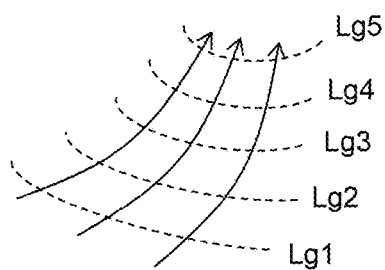

In FIG. 8C, the plane including the game field is drawn as if the plane is overlooked obliquely from above. A base line Lf1 and other imaginary lines Lf2 to Lf5 are also assumed according to this bird's-eye view drawing. The pieces are arranged on the imaginary lines assumed in this way. Three arrows indicate an advancing direction. In FIG. 8D, the curved surface including the game field is drawn as if the curved surface is overlooked obliquely from the back. A base line Lg1 and other imaginary lines Lg2 to Lg5 are also assumed according to this bird's-eye view drawing. The pieces are arranged on the imaginary lines assumed in this way. Three arrows indicate an advancing direction.

In the present invention, game spaces are not limited to FIGS. 8A to 8D and various game spaces can be adopted.

A chained piece search (piece erasing) logic of the information processing apparatus or the game program according to the embodiment of the present invention is explained with reference to FIG. 9. This explanation of processing is detailed explanation of the processing in step S506 and step S507 in FIG. 5.

Figure 9:
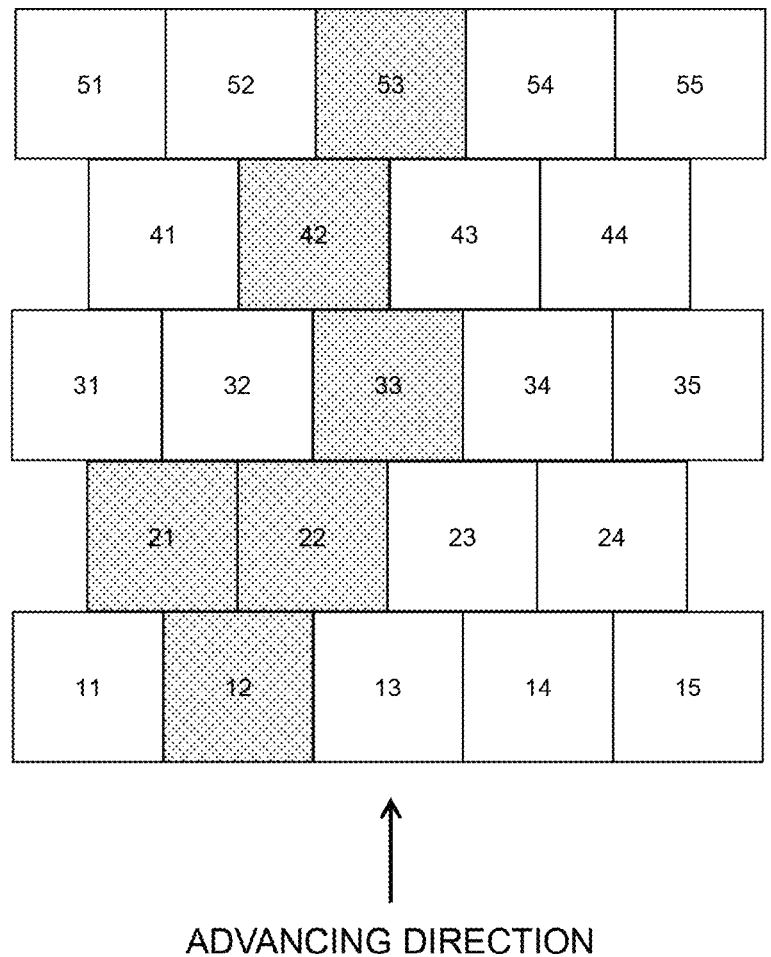
FIG. 9 is an explanatory diagram for explaining a chained piece search (piece erasing) logic of the information processing apparatus or a game program according to the embodiment of the present invention.

In FIG. 9, on the game field, pieces 11 to 15 (pieces arranged on a line (a base line) corresponding to a frontmost row among imaginary lines), pieces 21 to 24 (pieces arranged on the next imaginary line (a second imaginary line) in an advancing direction (a direction of an arrow in the figure) viewed from the base line), pieces 31 to 35 (pieces arranged on the next imaginary line (a third imaginary line) in the advancing direction viewed from the second imaginary line), pieces 41 to 44 (pieces arranged on the next imaginary line (a fourth imaginary line) in the advancing direction viewed from the third imaginary line), and pieces 51 to 55 (pieces arranged on the next imaginary line (a fifth imaginary line) in the advancing direction viewed from the fourth imaginary line) are arranged. It is assumed that the player operates (selects or points) the piece 12 on the base line.

The pieces 21, 22, 33, 42, and 53 are pieces of the same kind (the same color) as the piece 12 (some of the pieces may be the "specific pieces" explained above). At least the pieces 32, 43, and 52 are pieces of not the same kind (the same color) as the piece 12.

For convenience of explanation, colors of main pieces in FIG. 9 are as shown in the following table.

TABLE 2

| Piece number | Color |
| --- | --- |
| 12 | Red |
| 21 | Red |
| 22 | Red |
| 32 | Blue |
| 33 | Rainbow |
| 42 | Red |
| 43 | Yellow |
| 52 | Green |
| 53 | Red |

Chained Piece Search Step

In the information processing apparatus or the game program in the embodiment of the present invention, taking operation (selection or pointing) of a piece on the base line by the player as an opportunity, pieces to be chained in the following processing procedure are searched starting from the piece operated by the player.

(S1) It is determined whether or not pieces arranged on the next imaginary line in an advancing direction viewed from an imaginary line on which a selected or pointed piece A is arranged, which are two left and right pieces B and C vertically adjacent to the piece A, belong to a category of the same kind as the piece A (the category does not change even if a processing target imaginary line advances) (however, if the determination target piece is the "specific piece", the pieces are unconditionally regarded as the same type).

(S2) If both of the pieces B and C are not the same kind as the piece A, the search processing ends.

(S3) If one of the pieces B and C is the same kind as the piece A, the piece of the same kind is selected and added to a list L1 including the piece A at the top. If another piece adjacent to the piece of the same kind on an imaginary line on which the piece of the same kind is present is a piece of the same type, as long as a link of the piece of the same kind continues, the piece of the same kind is added to the list L2.

(S4) If both of the pieces B and C are the same kind as the piece A, a piece is selected according to a predetermined rule (e.g., a right side is always selected, a left side is always selected, a right side is always preferentially selected when pieces are present on an odd number line from a base line set as a first imaginary line, or a left side is always preferentially selected when pieces are present on an even number line) and added to the list L1 including the piece A at the top.

The piece not selected at this point is also the same kind as the piece A, the piece is added to another list L2.

(S5) When the piece of the same kind as the piece A is selected in (S3) or (S4), the selected piece is set as a new "piece A" and the processing in (S1) to (S4) is performed starting from the new piece A (however, the category itself for determining whether a piece is the same type does not change).

(S6) As long as a case corresponding to (S2) does not occur, (S1) to (S5) are repeated until a piece on a line serving as a last imaginary line in the advancing direction is determined.

When this is specifically examined with reference to FIG. 9, first, in FIG. 9, since the piece 12 (red) on the base line (the first imaginary line) is selected, it is determined whether pieces on the next second imaginary line in the advancing direction, which are the piece 21 and the piece 22 adjacent to the piece 12, are the same kind (S1).

Both of the pieces 21 and 22 are "red". Therefore, in view of a predetermined condition (in this example, a right side is always selected), the piece 22 is selected and added to the list L1 including the piece 12 at the top. The piece 21 not selected at this point is added to the other list L2 (S4).

Subsequently, starting from the piece 22, it is determined whether the piece 32 and the piece 33 on pieces on a third imaginary line are the same kind as the piece 12 (the initial category of "red") (S5). The piece 32 is "blue". However, the piece 33 is "rainbow". Therefore, this time, the piece 33 is determined as the same kind and added to the list L1.

Subsequently, starting from the piece 33, it is determined whether the piece 42 and the piece 43 on pieces on a fourth imaginary line are the same kind as the piece 12 (the initial category of "red"). The piece 42 is "red" and the piece 43 is "yellow". Therefore, this time, the piece 42 is determined as the same kind and added to the list L1.

Subsequently, starting from the piece 42, it is determined whether the piece 52 and the piece 53 on pieces on a fifth imaginary line are the same kind as the piece 12 (the initial category of "red"). The piece 52 is "green" and the piece 53 is "red". Therefore, this time, the piece 53 is determined as the same kind and added to the list L1.

Pieces on the next imaginary line to be processed are absent (exhausted). Therefore, the processing is ended.

Based on the above explanation referring to FIG. 9, content of the list L1 is L1=[12, 22, 33, 42, 53] as a list of piece numbers and content of the list L2 is L2=[21].

At this point, a chain formed piece group in a narrow sense is (a group of) pieces entered in L1. A chain formed piece group in a broad sense is (a group of) pieces obtained by adding (a group of) pieces entered in L2 to the (group of) pieces entered in L1.

An acquired point and damage that can be given to an enemy (a hit point) are calculated on the basis of, for example, the number of pieces of a piece group determined as being chain-formed. Erasing processing of the chain-formed piece group is performed.

Note that the piece 21 in the example shown in FIG. 9 (which is not selected as a piece serving as a processing start point on an imaginary line but is set as an erasing target) is referred to as "explosion induction piece". As explained above, the "explosion induction piece" is pieces concatenated as the same kind as pieces serving as processing start points on imaginary lines and are all pieces continuing as the same kind as the pieces at the processing start points (groups of pieces liked laterally on the imaginary lines). If all the pieces 21 to 24 are pieces of the same kind in FIG. 9, the pieces 21, 23, and 24 are stored in L2. All of the pieces can be processed as explosion induction pieces.

A logic of piece rearrangement and the like of the information processing apparatus and the game program according to the embodiment of the present invention are explained with reference to FIGS. 10 and 11. For convenience of explanation, the explanation is based on how the pieces are rearranged in empty spaces of the chained piece group erased in FIG. 9 (general processing steps are also explained). The processing in step S508 of FIG. 5 is explained in detail.

Figure 10:
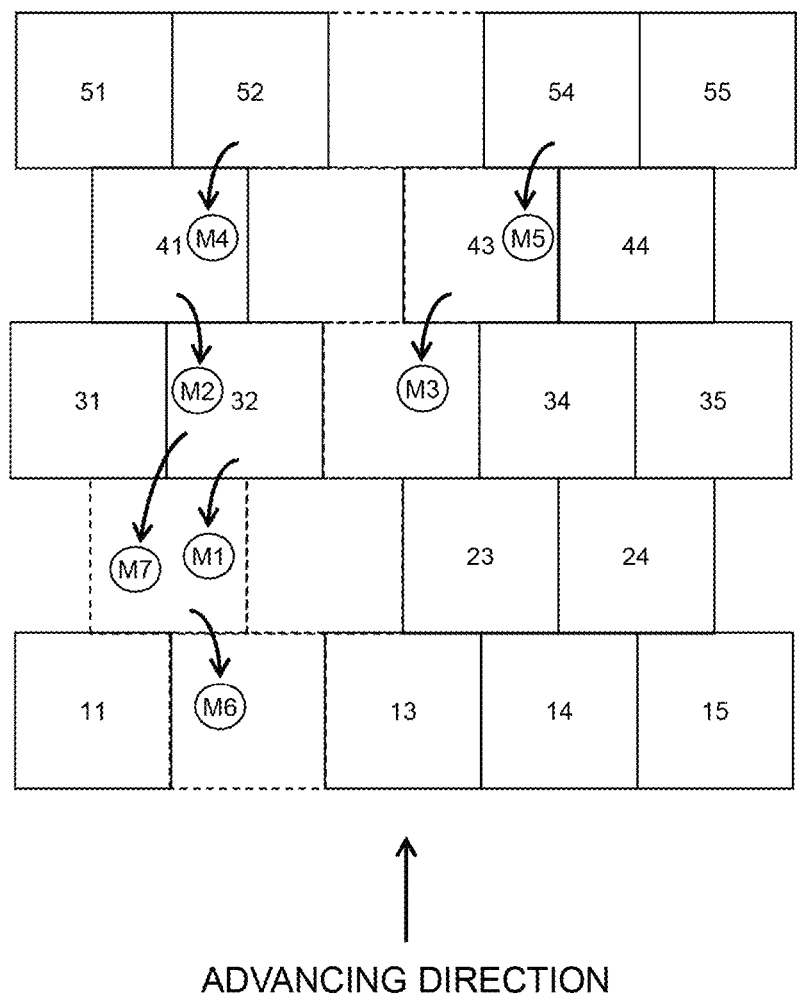
FIG. 10 is an explanatory diagram for explaining a logic of piece rearrangement or the like of the information processing apparatus or the game program according to the embodiment of the present invention.

In FIG. 10, the remaining piece groups excluding the chained piece group erased in FIG. 9 are arranged on the game field.

Rearranging Step of Pieces

In the information processing apparatus or the game program in the embodiment of the present invention, the pieces are rearranged in the following processing procedure after the erasing processing of the chained piece group.

(D1) Positions on the first imaginary line in a first round (the second and subsequent imaginary lines in second and subsequent rounds) are inspected in order from an end skipping a piece position (hereinafter "position") where a piece is present. If an empty position A where a piece is absent is found, it is inspected whether pieces are present in positions arranged on the next imaginary line in the advancing direction viewed from the line, which are left and right two positions vertically adjacent to the empty position A.

(D2) If pieces are absent in both of the left and right positions vertically adjacent to the empty position A, processing same as (D1) and (D2) is performed in the next position of the empty position A (a position adjacent to the empty position A present on the imaginary line on which the empty position A is present).

(D3) When pieces are present in both of the left and right positions vertically adjacent to the empty position A, one of the left and right pieces is selected according to a predetermined rule (e.g., a piece on a right side is always selected, a piece on a left side is always selected, a right side is always preferentially selected when pieces are present on an odd number line from a base line set as a first imaginary line, or a left side is always preferentially selected when pieces are present on an even number line). The selected piece is moved to the empty position A.

(D4) When the inspection of all the positions present on the imaginary line same as the imaginary line on which the empty position A is present is finished, the imaginary line to be inspected is shifted to the next line in the advancing direction (shifted to the second imaginary line when the inspection of the first imaginary line is finished). Processing same as (D1) to (D3) is performed in order to find a new empty position A.

(D5) When the inspection of all positions on the second imaginary line from the last in the advancing direction is finished, the processing returns to the inspection for the positions on the base line (the first imaginary line) and processing same as (D1) to (D5) is performed.

(D6) The processing is ended at a point when there are no pieces to be rearranged.

Figure 11:
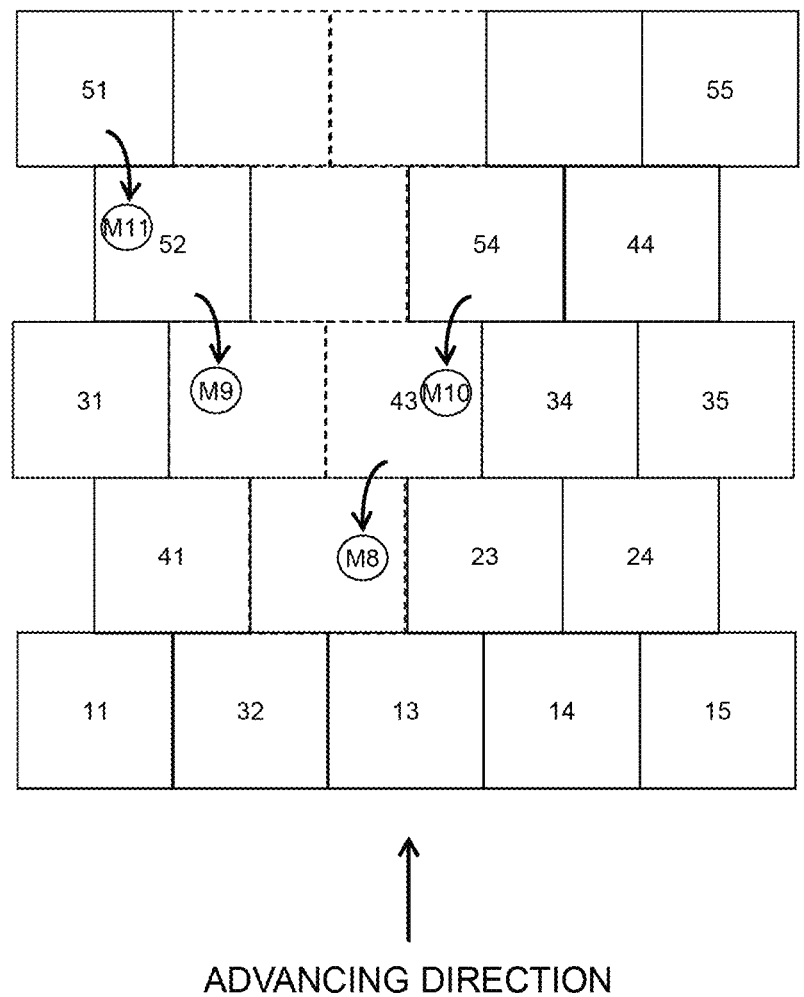
FIG. 11 is an explanatory diagram for explaining a logic of piece rearrangement of the information processing apparatus and the game program according to the embodiment of the present invention.

When this is specifically examined with reference to FIGS. 10 and 11, first, in FIG. 10, the pieces on the base line are inspected in order from the end (the position of the piece 11). An empty position (a position where the piece 12 is present in FIG. 9) where a piece is absent is found in a second position from the left on the base line. Therefore, first, processing starting from the empty position is performed. It is inspected whether pieces are present in positions on the next second imaginary line of the base line viewed from the empty position, which are left and right two positions (positions where the pieces 21 and 22 are present in FIG. 9) vertically adjacent to the empty position (D1).

As shown in FIG. 10, pieces are absent in both of the left and right two positions to be inspected (the positions where the pieces 21 and 22 are present in FIG. 9). Therefore, piece rearrangement in the positions cannot be performed. The pieces 13 to 15 on the base line are inspected one after another (rearrangement is impossible because all the pieces are present). This time, the imaginary line to be inspected is shifted to the next line (the second imaginary line) in the advancing direction (D4).

Subsequently, piece positions on the second imaginary line are inspected in order from an end (for convenience, the left end). Vertically adjacent pieces to be moved are found in a first empty position from the left (the position where the piece 21 is present in FIG. 9). Pieces are present in both of left and right positions vertically adjacent to the empty position. Therefore, according to a predetermined processing procedure (a rule "an upper left piece is more preferentially moved to an empty position on an odd number imaginary line than an upper right piece and the upper right piece is more preferentially moved to an empty position on an even number imaginary line than the upper left piece" is applied), the upper right piece (the piece 32) is moved to the empty position (the position where the piece 21 is present in FIG. 9) (piece movement M1 in FIG. 10).

Subsequently, a second piece position from the left on the second imaginary line is inspected. However, a piece to be moved to the piece position is absent. Further, the inspection proceeds to the next piece position. However, since piece movement to the piece 23 and the piece 24 cannot be performed, the imaginary line to be inspected is shifted to the next line (the third imaginary line) (D4).

A first empty position found by inspecting positions on the third imaginary line from an end (for convenience, the left end) in order is a second position from the left (a position where the piece 32 is originally present in FIG. 10). Since the empty position is an empty position on an odd number imaginary line, an upper left piece is more preferentially moved than an upper right piece. However, since the piece 41 is present right in the upper left (a piece is absent in the upper right), the piece 41 is moved to the empty position (piece movement M2). A movable piece is also present in the next empty position (a third position from the left of the third imaginary line). Since the piece 43 is present in the upper right rather than the upper left where the piece should be preferentially moved, the piece 43 is moved to the third empty position from the left of the third imaginary line (piece movement M3). The inspection on the third imaginary line ends (because piece movement to the positions of the pieces 34 and 35 is impossible).

Subsequently, a first empty position found by inspecting positions on the fourth imaginary line from an end (for convenience, the left end) in order is a position at the left end (a position where the piece 41 is originally present in FIG. 10). Since the empty position is an empty position on an even number imaginary line, an upper right piece is more preferentially moved than an upper left piece. The piece 52 is moved to the empty position (piece movement M4). Subsequently, since the piece 43 has already been moved to the third position from the left of the fourth imaginary line, a position where the piece 43 is originally present is an empty position. The piece 54 in the upper right is moved to the empty position (piece movement M5).

The inspection of all the positions on the second imaginary line from the last in the advancing direction is finished here. Therefore, the processing returns to the inspection for the positions on the base line (the first imaginary line) (D5).

Subsequently, processing on the base line in a second round is performed. A first empty position found by inspecting positions from an end (for convenience, the left end) in order is a second empty position from the left. This time, the piece 32 is moved down to the upper left (the upper right is still empty). Therefore, the piece 32 in the upper left is moved to the empty position (piece movement M6). Pieces are filled in all the following piece positions on the base line. Therefore, pieces cannot be moved to the piece positions anew. The imaginary line to be inspected shifts to the second imaginary line.

In the processing on the second imaginary line in the second round, a first empty position found by inspecting positions from an end (for convenience, the left end) in order is a first empty position from the left. The piece 31 in the upper left and the piece 41 in the upper right can be moved to the empty position. However, on the second imaginary line (an even number imaginary line), a piece in the upper right is more preferentially moved than a piece in the upper left. Therefore, the piece 41 in the upper right is moved to the empty position (piece movement M7).

The piece rearrangement shown in FIG. 10 (from the rearrangement start to halfway in the inspection in the second round) is as explained above. An arrangement state of the pieces immediately after the rearrangement processing explained with reference to FIG. 10 is as shown in FIG. 11 (when the piece movement M7 in FIG. 10 is ended, the piece 41 fits in the left end of the second imaginary line).

In FIG. 11, the rearrangement processing of the pieces is continued following FIG. 10. As actual piece movement, movement of the piece 43 (piece movement M8 in FIG. 11), movement of the piece 52 (piece movement M9), movement of the piece 54 (piece movement M10), and movement of the piece 51 (piece movement M11) are sequentially executed.

At this point, even if the processing returns to the base line (the first imaginary line) and the inspection is performed again, the processing ends because pieces to be rearranged are exhausted.

Figure 12:
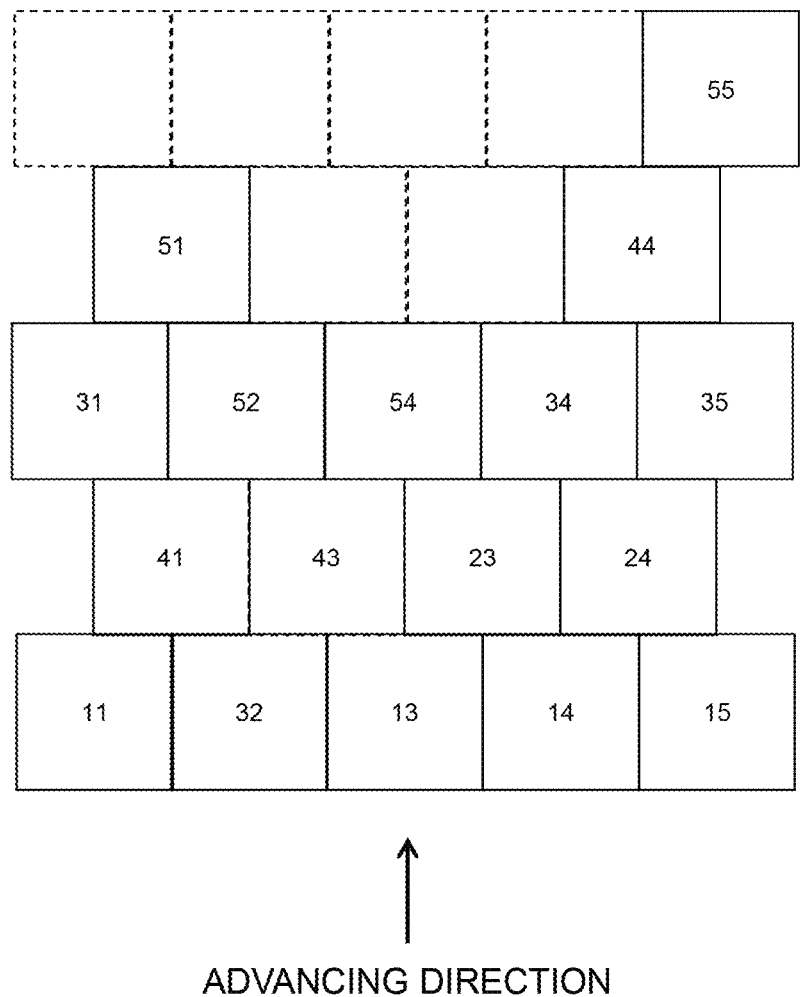
FIG. 12 is an explanatory diagram for explaining a state of filling of pieces of the information processing apparatus or the game program according to the embodiment of the present invention.

A state of piece arrangement at a point when the rearrangement processing of the pieces explained with reference to FIGS. 10 and 11 is completed is as shown in FIG. 12.

In FIG. 12, a state of filling of pieces of the information processing apparatus or the game program according to the embodiment of the present invention is shown. As explained above, FIG. 12 is a state of the pieces at a point when the rearrangement of the pieces explained with reference to FIGS. 10 and 11 is completed. Positions where the pieces 42, 43, and 51 to 54 are present in FIG. 9 are empty spaces.

Typically, new pieces extracted at random can be filled in these empty spaces in FIG. 12.

The processing corresponds to more detailed processing of step S509 of FIG. 5.

Figure 13:
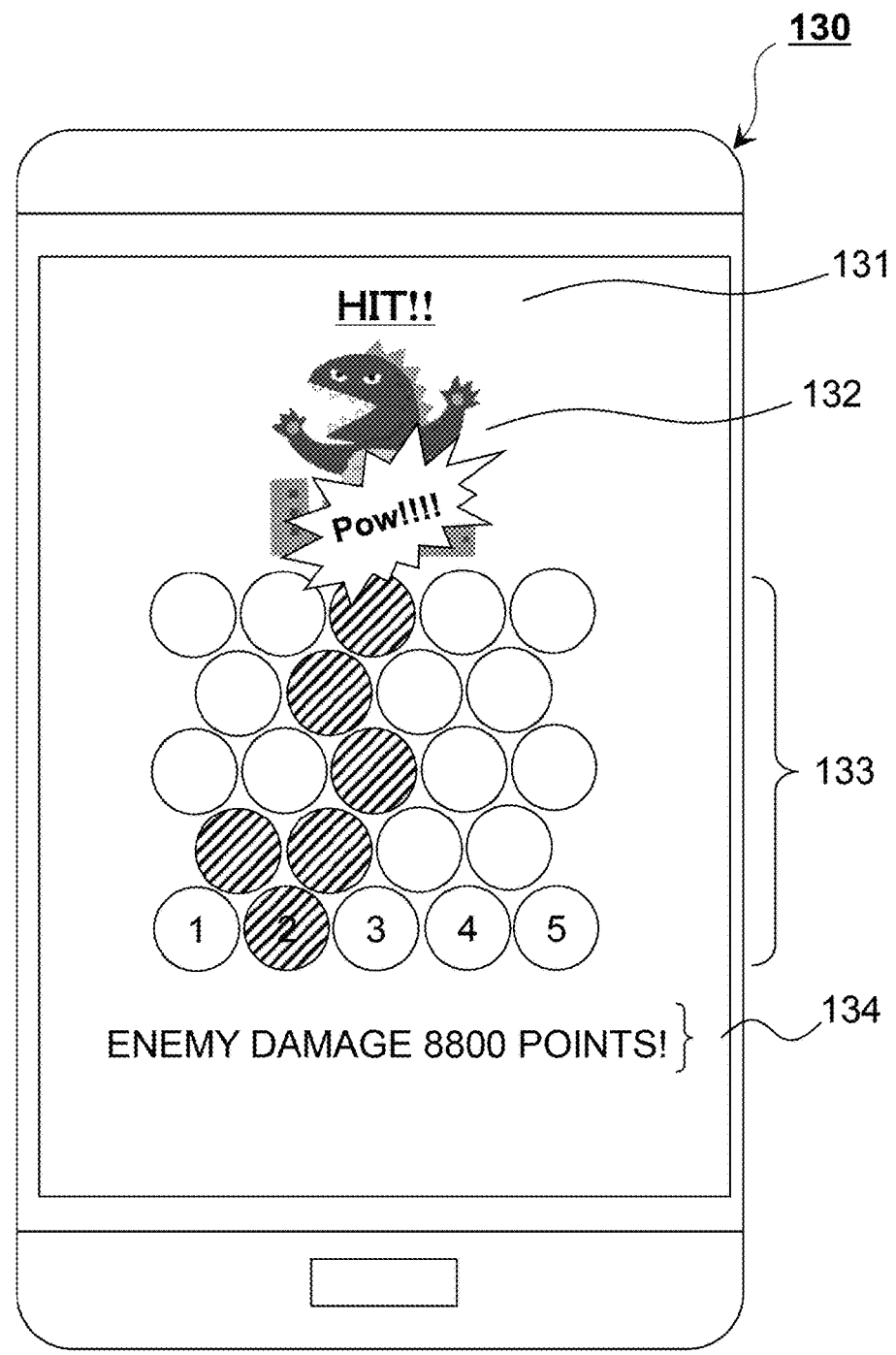
FIG. 13 is an explanatory diagram for explaining a screen example (a state of attack) of the information processing apparatus according to the embodiment of the present invention.

Through the series of processing operations explained with reference to FIGS. 9 to 12, the pieces are processed as a set of attacks against an enemy shown in FIG. 13. That is, in FIG. 13, in a display unit of an information terminal device 130, together with telop display 131 "HIT!!", display 132 showing a state in which an enemy character is attacked by a player is performed. A chain of the pieces is represented in a game field 133. A hit point of damage that can be given to the enemy by the chain is calculated as 8800 points (134). It goes without saying that a calculation method for the hit point can be variously designed according to the configurations of games.

The series of processing operation is continued until a predetermined hit point is accumulated in the case of a puzzle battle game for defeating an enemy and until a point reaches a predetermined cumulative point or the number of pieces to be erased reaches a predetermined number in the case of a connecting puzzle game for stage clear.

The embodiments of the information processing apparatus, the game program, and the like are explained above on the basis of the specific examples. However, an embodiment of the present invention can also take an implementation form functioning as, besides a method or a computer program for implementing a system or an apparatus, a storage medium (as an example, an optical disk, a magneto-optical disk, a CD-ROM, a CD-R, a CD-RW, a magnetic tape, a hard disk, or a memory card) or the like having the computer program recorded therein.

An implementation form of the computer program is not limited to application programs such as an object code compiled by a compiler and a program code executed by an interpreter and may be a form such as a program module incorporated in an operating system.

Further, entire processing of the computer program does not always need to be carried out only in a CPU on a control board. A part of or the entire processing may be carried out by another processing unit (a DSP, etc.) implemented by an extension board or an extension unit added to the board according to necessity.

All the constituent elements described in this specification (including the claims, the abstract, and the drawings) and/or all the methods or all the steps of the processing disclosed in the specification can be combined in any combination except a combination in which features of the constituent elements and the methods or the steps of the processing are exclusive to one another.

The respective features described in this specification (including the claims, the abstract, and the drawings) can be replaced with alternative features functioning for the same purposes, equivalent purposes, or similar purposes unless explicitly denied. Therefore, the respective disclosed features are only examples of a collective series of same or equivalent features unless explicitly denied.

Further, the present invention is not limited to any one of the specific configurations of the embodiments explained above. The present invention can be extended to all the new features or the combinations of the new features or all the new methods or the new steps of the processing or the combinations of the new methods or the new steps described in this specification (including the claims, the abstract, and the drawings).

REFERENCE SIGNS LIST 15 tablet terminal (a form of an information processing apparatus)
30 information processing system
31 information processing server
32, 33 PC (a form of the information processing apparatus)
34 cellular phone (a form of the information processing apparatus)
39 public line (a dedicated line, the Internet, etc.)

What is claimed is:

1. An information processing apparatus that erases, on the basis of a chained state of a plurality of pieces arranged on a game field formed by a user operation for one piece selected from the plurality of pieces, said one piece is a start piece of the plurality of pieces in the chained state, the arrangement of the plurality of pieces arranged in the game field being controlled such that, in a predetermined region on the game field, an odd number of pieces and an even number of pieces are alternately arranged on a plurality of imaginary lines arranged in an advancing direction on the game field, the information processing apparatus comprising:

for erasing the plurality of pieces, a processor configured to:
(A) receive a user operation for selecting any one piece among the plurality of pieces on the imaginary line corresponding to a frontmost row among the plurality of imaginary lines, and determine whether a piece of a same kind as the selected one piece is present in left and right pieces adjacent to the selected one piece present on a next imaginary line in the advancing direction from the selected one piece,
(B) when it is determined that the piece of the same kind as the selected one piece is present, determine whether a piece of a same kind as the piece of the same kind is present in left and right pieces adjacent to the piece of the same kind present on a next imaginary line in the advancing direction viewed from the piece of the same kind,
(C) when the processing shifts to the processing (B) according to the determination of the processing (A), repeat the processing (B) until it is determined that the piece of the same kind is absent, and
(D) process, as a target of erasing, a serial piece group formed as a chain by the processing (A) to (C), wherein after erasing the plurality of pieces, the processor is configured to:
(E) inspect piece positions on the imaginary line corresponding to the frontmost row in order from an end, determine whether pieces are present in left and right positions adjacent to an empty position where a piece is absent, the left and right positions being present on a next imaginary line in the advancing direction from the empty position, and, when the piece is present in one of the left and right positions adjacent to the empty position, move the piece in one of the left and right positions to the empty position;
(F) when finishing the inspection of the piece positions on the imaginary line to the other end, inspect piece positions on a next imaginary line in the advancing direction from the imaginary line in order from an end, determine whether pieces are present in left and right positions adjacent to an empty position where a piece is absent, the left and right positions being present on a next imaginary line in the advancing direction from the empty position, and, when the piece is present in one of the left and right positions adjacent to the empty position, move the piece in one of the left and right positions to the empty position;
(G) repeat the processing (F) for up to piece positions on a second imaginary line from a last row among the plurality of imaginary lines; and
(H) repeat the processing (E) to the processing (G) until pieces in both of the left and right positions that should be moved to the empty position are exhausted.

2. The information processing apparatus according to claim 1, wherein, when it is determined in the processing (B) that both of the left and right pieces are pieces of the same kind, the processor selects one of the left and right pieces and the processing (B) proceeds to the processing (C).

3. The information processing apparatus according to claim 2, wherein, when it is determined that both of the left and right pieces are pieces of the same kind and when one of the left and right pieces is selected, the processor processes the unselected piece as the target of erasing in the processing (D).

4. The information processing apparatus according to claim 1, wherein, when it is determined in the processing (B) that a piece of the same kind as the selected one piece is present, the processor processes another piece of the same kind adjacent to the piece of the same kind on the imaginary line on which the piece of the same kind is present as the erasing target in the processing (D).

5. The information processing apparatus according to claim 1, wherein the plurality of pieces include a specific piece recognized as the same kind as all kinds of pieces.

6. A processing method for causing an information processing apparatus with a display and a processor configured to erase, on the basis of a chained state of a plurality of pieces arranged on a game field in the display formed by a user operation for selecting one piece from the plurality of pieces, said one piece is a start piece of the plurality of pieces in the chained state from the display, when being executed on the information processing apparatus, the processing method causing the information processing apparatus to control the arrangement of the plurality of pieces arranged in the game field such that, in a predetermined region on the game field, an odd number of pieces and an even number of pieces are alternately arranged on a plurality of imaginary lines arranged in an advancing direction on the game field, in erasing the plurality of pieces from the display, the processing method comprising:

(A) a processing step for receiving, by the processor, the user operation for selecting any one piece among the plurality of pieces on the imaginary line corresponding to a frontmost row among the plurality of imaginary lines, whether a piece of a same kind as the selected one piece is present in left and right pieces adjacent to the selected one piece present on the next imaginary line in the advancing direction from the operated selected one piece, (B) a processing step for, when it is determined by the determination that the piece of the same kind as the selected one piece is present, determining, by the processor, whether a piece of a same kind as the piece of the same kind is present in left and right pieces adjacent to the piece of the same kind is present on the next imaginary line in the advancing direction viewed from the piece of the same kind, (C) a processing step for, when the processing shifts to the processing (B) according to the determination of the processing (A), repeating, by the processor, the processing (B) until it is determined that the piece of the same kind is absent, and (D) a processing step for processing, by the processor, as a target of erasing, a serial piece group formed as a chain by the processing (A) to (C), after erasing the plurality of pieces from the display:

(E) a processing step for inspecting piece positions on the imaginary line corresponding to the frontmost row in order from an end, determining, by the processor, whether pieces are present in left and right positions adjacent to an empty position where a piece is absent, the left and right positions being present on a next imaginary line in the advancing direction from the empty position, and, when the piece is present in one of the left and right positions adjacent to the empty position, moving the piece in one of the left and right positions to the empty position;

(F) a processing step for, when finishing the inspection of the piece positions on the imaginary line to the other end, inspecting, by the processor, piece positions on a next imaginary line in the advancing direction from the imaginary line in order from an end, determining whether pieces are present in left and right positions adjacent to an empty position where apiece is absent, the left and right positions being present on a next imaginary line in the advancing direction from the empty position, and, when the piece is present in one of the left and right positions adjacent to the empty position, moving the piece in one of the left and right positions to the empty position;

(G) a processing step for repeating, by the processor, the processing (F) for up to piece positions on a second imaginary line from a last row among the plurality of imaginary lines; and (H) a processing step for repeating, by the processor, the processing (E) to the processing (G) until pieces in both of the left and right positions that should be moved to the empty position are exhausted.

7. The processing method according to claim 6, wherein, when it is determined in the processing (B) that both of the left and right pieces are pieces of the same kind, one of the left and right pieces is selected by the processor, and the processing (B) proceeds to the processing (C).

8. The processing method according to claim 7, wherein, when it is determined that both of the left and right pieces are pieces of the same kind and when one of the left and right pieces is selected, the unselected piece is processed by the processor as the target of erasing in the processing (D).

9. The processing method according to claim 6, wherein, when it is determined in the processing (B) that a piece of the same kind as the selected one piece is present, another piece of the same kind adjacent to the piece of the same line on the imaginary line on which the piece of the same kind is present is processed by the processor as the erasing target in the processing (D).

10. The processing method according to claim 6, wherein the plurality of pieces include a specific piece recognized as the same kind as all kinds of pieces.

* * * * *